United States Patent
Vetter et al.

(10) Patent No.: US 8,920,876 B2
(45) Date of Patent: Dec. 30, 2014

(54) METHOD FOR PRODUCING A BUILDING PANEL

(71) Applicant: Välinge Innovation AB, Viken (SE)

(72) Inventors: Georg Vetter, Viken (SE); Jan Jacobsson, Landskrona (SE); Rickard Rittinge, Viken (SE); Hans Persson, Perstorp (SE)

(73) Assignee: Välinge Innovation AB, Viken (SE)

( * ) Notice: Subject to any disclaimer, the term of this patent is extended or adjusted under 35 U.S.C. 154(b) by 0 days.

(21) Appl. No.: 13/804,355

(22) Filed: Mar. 14, 2013

(65) Prior Publication Data

US 2013/0273244 A1    Oct. 17, 2013

Related U.S. Application Data

(60) Provisional application No. 61/612,672, filed on Mar. 19, 2012.

(51) Int. Cl.
| | |
|---|---|
| *B05D 1/12* | (2006.01) |
| *B05D 3/12* | (2006.01) |
| *B05D 1/36* | (2006.01) |
| *E04B 1/00* | (2006.01) |

(52) U.S. Cl.
CPC ..................................... *E04B 1/00* (2013.01)
USPC ............ 427/261; 427/271; 427/277; 427/370

(58) Field of Classification Search
USPC .................................. 427/261, 271, 277, 370
See application file for complete search history.

(56) References Cited

U.S. PATENT DOCUMENTS

| | | | |
|---|---|---|---|
| 2,587,064 A | 2/1952 | Rapson | |
| 2,962,081 A | 11/1960 | Dobry et al. | |
| 3,032,820 A | 5/1962 | Johnson | |
| 3,135,643 A | 6/1964 | Michl | |
| 3,308,013 A | 3/1967 | Bryant | |
| 3,325,302 A | 6/1967 | Hosfeld | |
| 3,342,621 A | 9/1967 | Point et al. | |
| 3,345,234 A | 10/1967 | Jecker et al. | |
| 3,426,730 A | 2/1969 | Lawson et al. | |
| 3,463,653 A | 8/1969 | Letter | |

(Continued)

FOREIGN PATENT DOCUMENTS

| | | |
|---|---|---|
| AU | 80284/75 | 6/1975 |
| CA | 2 557 096 A1 | 7/2005 |

(Continued)

OTHER PUBLICATIONS

Ziegler, Göran, et al., U.S. Appl. No. 13/912,564, entitled "Bright Coloured Surface Layer," filed Jun. 7, 2013.

(Continued)

*Primary Examiner* — Frederick Parker
(74) *Attorney, Agent, or Firm* — Buchanan Ingersoll & Rooney P.C.

(57) ABSTRACT

A method for producing a building panel. The method includes forming a mix including wood particles, a solvent, a binder and optionally at least one additive, wherein the binder and optionally said at least one additive are homogenously distributed in the mix by means of the solvent and wherein the binder impregnates the wood particles, drying the mix, applying the mix on a substrate, and forming a layer by applying heat and pressure to the mix.

25 Claims, 5 Drawing Sheets

(56) References Cited

U.S. PATENT DOCUMENTS

| | | | |
|---|---|---|---|
| 3,486,484 A | 12/1969 | Bullough | |
| 3,533,725 A * | 10/1970 | Bridgeford | 8/115.6 |
| 3,540,978 A | 11/1970 | Ames | |
| 3,565,665 A | 2/1971 | Stranch et al. | |
| 3,673,020 A | 6/1972 | De Jaeger | |
| 3,846,219 A | 11/1974 | Kunz | |
| 3,880,687 A | 4/1975 | Elmendorf et al. | |
| 3,897,185 A | 7/1975 | Beyer | |
| 3,897,588 A | 7/1975 | Nohtomi | |
| 3,914,359 A | 10/1975 | Bevan | |
| 3,961,108 A | 6/1976 | Rosner et al. | |
| 4,052,739 A | 10/1977 | Wada et al. | |
| 4,093,766 A | 6/1978 | Scher et al. | |
| 4,131,705 A | 12/1978 | Kubinsky | |
| 4,313,857 A | 2/1982 | Blount | |
| 4,337,290 A | 6/1982 | Kelly et al. | |
| 4,430,375 A | 2/1984 | Scher et al. | |
| 4,474,920 A | 10/1984 | Kyminas et al. | |
| 5,034,272 A | 7/1991 | Lindgren et al. | |
| 5,206,066 A | 4/1993 | Horacek | |
| 5,246,765 A | 9/1993 | Lussi et al. | |
| 5,258,216 A | 11/1993 | Von Bonin et al. | |
| 5,422,170 A | 6/1995 | Iwata et al. | |
| 5,543,193 A | 8/1996 | Tesch | |
| 5,569,424 A | 10/1996 | Amour | |
| 5,601,930 A | 2/1997 | Mehta et al. | |
| 5,604,025 A | 2/1997 | Tesch | |
| 5,609,966 A | 3/1997 | Perrin et al. | |
| 5,855,832 A | 1/1999 | Clausi | |
| 5,925,296 A | 7/1999 | Leese | |
| 5,942,072 A | 8/1999 | McKinnon | |
| 6,036,137 A | 3/2000 | Myren | |
| 6,103,377 A | 8/2000 | Clausi | |
| 6,238,750 B1 | 5/2001 | Correll et al. | |
| 6,468,645 B1 | 10/2002 | Clausi | |
| 6,521,326 B1 | 2/2003 | Fischer et al. | |
| 6,537,610 B1 | 3/2003 | Springer et al. | |
| 6,773,799 B1 | 8/2004 | Persson et al. | |
| 6,803,110 B2 | 10/2004 | Drees et al. | |
| 6,926,954 B2 * | 8/2005 | Schuren et al. | 428/292.4 |
| 6,991,830 B1 | 1/2006 | Hansson et al. | |
| 7,022,756 B2 | 4/2006 | Singer | |
| 7,485,693 B2 | 2/2009 | Matsuda et al. | |
| 7,811,489 B2 | 10/2010 | Pervan | |
| 8,349,234 B2 | 1/2013 | Ziegler et al. | |
| 8,349,235 B2 | 1/2013 | Pervan et al. | |
| 8,419,877 B2 | 4/2013 | Pervan et al. | |
| 8,431,054 B2 | 4/2013 | Pervan et al. | |
| 8,480,841 B2 | 7/2013 | Pervan et al. | |
| 8,481,111 B2 | 7/2013 | Ziegler et al. | |
| 8,617,439 B2 | 12/2013 | Pervan et al. | |
| 8,663,785 B2 | 3/2014 | Ziegler et al. | |
| 2001/0006704 A1 | 7/2001 | Chen et al. | |
| 2001/0009309 A1 | 7/2001 | Taguchi et al. | |
| 2002/0054994 A1 | 5/2002 | Dupre et al. | |
| 2002/0100231 A1 | 8/2002 | Miller | |
| 2003/0056873 A1 | 3/2003 | Nakos et al. | |
| 2003/0102094 A1 | 6/2003 | Tirri et al. | |
| 2003/0208980 A1 | 11/2003 | Miller et al. | |
| 2004/0123542 A1 | 7/2004 | Grafenauer | |
| 2004/0191547 A1 | 9/2004 | Oldorff | |
| 2004/0202857 A1 | 10/2004 | Singer | |
| 2004/0206036 A1 | 10/2004 | Pervan | |
| 2004/0237436 A1 | 12/2004 | Zuber et al. | |
| 2004/0250911 A1 | 12/2004 | Vogel | |
| 2005/0003099 A1 | 1/2005 | Quist | |
| 2005/0079780 A1 | 4/2005 | Rowe et al. | |
| 2005/0193677 A1 | 9/2005 | Vogel | |
| 2005/0252130 A1 | 11/2005 | Martensson | |
| 2006/0008630 A1 | 1/2006 | Thiers et al. | |
| 2006/0024465 A1 | 2/2006 | Briere | |
| 2006/0032175 A1 | 2/2006 | Chen et al. | |
| 2006/0070321 A1 | 4/2006 | Au | |
| 2006/0145384 A1 | 7/2006 | Singer | |
| 2006/0182938 A1 | 8/2006 | Oldorff | |
| 2006/0183853 A1 | 8/2006 | Sczepan | |
| 2007/0166516 A1 | 7/2007 | Kim et al. | |
| 2007/0184244 A1 | 8/2007 | Doehring | |
| 2007/0207296 A1 | 9/2007 | Eisermann | |
| 2007/0218260 A1 | 9/2007 | Miclo et al. | |
| 2007/0224438 A1 | 9/2007 | Van Benthem et al. | |
| 2007/0256804 A1 | 11/2007 | Garcis Espino et al. | |
| 2008/0000417 A1 | 1/2008 | Pervan et al. | |
| 2008/0032120 A1 | 2/2008 | Braun | |
| 2008/0090032 A1 | 4/2008 | Perrin et al. | |
| 2008/0176039 A1 | 7/2008 | Chen et al. | |
| 2008/0263985 A1 | 10/2008 | Hasch et al. | |
| 2009/0124704 A1 | 5/2009 | Jenkins | |
| 2009/0145066 A1 | 6/2009 | Pervan | |
| 2009/0155612 A1 * | 6/2009 | Pervan et al. | 428/498 |
| 2009/0208646 A1 | 8/2009 | Kreuder et al. | |
| 2009/0294037 A1 | 12/2009 | Oldorff | |
| 2009/0311433 A1 | 12/2009 | Wittmann | |
| 2010/0092731 A1 | 4/2010 | Pervan et al. | |
| 2010/0196678 A1 | 8/2010 | Vermeulen | |
| 2010/0223881 A1 | 9/2010 | Kalwa | |
| 2010/0239820 A1 | 9/2010 | Buhlmann | |
| 2010/0291397 A1 | 11/2010 | Pervan et al. | |
| 2010/0300030 A1 | 12/2010 | Pervan et al. | |
| 2010/0307675 A1 | 12/2010 | Buhlmann | |
| 2010/0307677 A1 | 12/2010 | Buhlmann | |
| 2010/0319282 A1 | 12/2010 | Ruland | |
| 2010/0323187 A1 | 12/2010 | Kalwa | |
| 2010/0330376 A1 | 12/2010 | Trksak | |
| 2011/0175251 A1 | 7/2011 | Ziegler et al. | |
| 2011/0177319 A1 | 7/2011 | Ziegler et al. | |
| 2011/0177354 A1 | 7/2011 | Ziegler et al. | |
| 2011/0189448 A1 | 8/2011 | Lindgren et al. | |
| 2011/0247748 A1 | 10/2011 | Pervan et al. | |
| 2011/0250404 A1 | 10/2011 | Pervan et al. | |
| 2011/0283642 A1 | 11/2011 | Meirlaen et al. | |
| 2011/0283650 A1 | 11/2011 | Pervan et al. | |
| 2011/0293823 A1 | 12/2011 | Bruderer et al. | |
| 2011/0293906 A1 | 12/2011 | Jacobsson | |
| 2012/0263878 A1 | 10/2012 | Ziegler et al. | |
| 2012/0263965 A1 | 10/2012 | Persson et al. | |
| 2012/0264853 A1 | 10/2012 | Ziegler et al. | |
| 2012/0288689 A1 | 11/2012 | Hansson et al. | |
| 2012/0308774 A1 | 12/2012 | Persson et al. | |
| 2013/0092314 A1 | 4/2013 | Ziegler et al. | |
| 2013/0095315 A1 | 4/2013 | Pervan et al. | |
| 2013/0111845 A1 | 5/2013 | Pervan et al. | |
| 2013/0189534 A1 | 7/2013 | Pervan et al. | |
| 2013/0269863 A1 | 10/2013 | Pervan et al. | |
| 2013/0273245 A1 | 10/2013 | Ziegler et al. | |
| 2014/0075874 A1 | 3/2014 | Pervan et al. | |

FOREIGN PATENT DOCUMENTS

| | | |
|---|---|---|
| CA | 2 852 656 A1 | 4/2013 |
| CH | 298894 A | 5/1954 |
| DE | 1 815 312 A1 | 7/1969 |
| DE | 7148789 U | 4/1972 |
| DE | 29 39 828 A1 | 4/1981 |
| DE | 33 34 921 A1 | 4/1985 |
| DE | 42 36 266 A1 | 5/1993 |
| DE | 202 14 532 U1 | 2/2004 |
| DE | 103 31 657 A1 | 2/2005 |
| DE | 20 2004 003 061 U1 | 7/2005 |
| DE | 10 2004 050 278 A1 | 4/2006 |
| DE | 20 2006 007 797 U1 | 8/2006 |
| DE | 10 2005 046 264 A1 | 4/2007 |
| DE | 10 2006 024 593 A1 | 12/2007 |
| DE | 10 2010 045 266 A | 3/2012 |
| EP | 0 129 430 A2 | 12/1984 |
| EP | 0 129 430 B1 | 1/1990 |
| EP | 0 355 829 A2 | 2/1990 |
| EP | 0 611 408 A1 | 12/1993 |
| EP | 0 592 013 A2 | 4/1994 |
| EP | 0 656 443 A1 | 6/1995 |
| EP | 0 611 408 B1 | 9/1996 |
| EP | 0 732 449 A1 | 9/1996 |
| EP | 0 744 477 A2 | 11/1996 |
| EP | 0 914 914 A2 | 5/1999 |

(56) References Cited

FOREIGN PATENT DOCUMENTS

| | | |
|---|---|---|
| EP | 0 732 449 B1 | 8/1999 |
| EP | 0 744 477 B1 | 1/2000 |
| EP | 1 035 255 A1 | 9/2000 |
| EP | 1 193 288 A1 | 4/2002 |
| EP | 1 209 199 A1 | 5/2002 |
| EP | 1 249 322 A1 | 10/2002 |
| EP | 1 454 763 A2 | 9/2004 |
| EP | 1 498 241 A2 | 1/2005 |
| EP | 1 507 664 A1 | 2/2005 |
| EP | 1 507 664 B1 | 2/2005 |
| EP | 1 584 378 A1 | 10/2005 |
| EP | 1 681 103 A2 | 7/2006 |
| EP | 1 690 603 A1 | 8/2006 |
| EP | 1 847 385 A1 | 10/2007 |
| EP | 1 961 556 A1 | 8/2008 |
| EP | 1 985 464 A1 | 10/2008 |
| EP | 1 997 623 A1 | 12/2008 |
| EP | 2 025 484 A1 | 2/2009 |
| EP | 1 454 763 B1 | 8/2009 |
| EP | 2 105 320 A1 | 9/2009 |
| EP | 2 213 476 A1 | 8/2010 |
| EP | 2 226 201 A1 | 9/2010 |
| EP | 2 246 500 A2 | 11/2010 |
| EP | 2 264 259 A2 | 12/2010 |
| EP | 2 272 667 A1 | 1/2011 |
| EP | 2 272 668 A1 | 1/2011 |
| EP | 2 305 462 A1 | 4/2011 |
| EP | 1 847 385 B1 | 9/2011 |
| FR | 2 873 953 A1 | 2/2006 |
| GB | 984 170 A | 2/1965 |
| GB | 1090450 | 11/1967 |
| GB | 2 248 246 A | 4/1992 |
| JP | 2-229002 A | 9/1990 |
| JP | 11-291203 A | 10/1999 |
| JP | 2001-287208 A | 10/2001 |
| JP | 2003-311717 A | 11/2003 |
| JP | 2003-311718 A | 11/2003 |
| JP | 2005-034815 A | 2/2005 |
| JP | 2005-074682 A | 3/2005 |
| JP | 2005-170016 A | 6/2005 |
| JP | 2005-219215 A | 8/2005 |
| JP | 3705482 B2 | 10/2005 |
| JP | 2005-307582 A | 11/2005 |
| JP | 2007-216692 A | 8/2007 |
| JP | 2007-268843 A | 10/2007 |
| JP | 2008-188826 A | 8/2008 |
| SE | 469 326 B | 6/1993 |
| WO | WO 92/06832 A1 | 4/1992 |
| WO | WO 94/00280 A1 | 1/1994 |
| WO | WO 95/06568 A1 | 3/1995 |
| WO | WO 00/22225 A1 | 4/2000 |
| WO | WO 00/44576 A1 | 8/2000 |
| WO | WO 01/48333 A1 | 7/2001 |
| WO | WO 01/64408 A1 | 9/2001 |
| WO | WO 01/92037 A2 | 12/2001 |
| WO | WO 02/42167 A2 | 5/2002 |
| WO | WO 03/078761 A1 | 9/2003 |
| WO | WO 03/095202 A1 | 11/2003 |
| WO | WO 2004/042168 A1 | 5/2004 |
| WO | WO 2004/050359 A1 | 6/2004 |
| WO | WO 2004/067874 A2 | 8/2004 |
| WO | WO 2005/054600 A1 | 6/2005 |
| WO | WO 2005/066431 A2 | 7/2005 |
| WO | WO 2005/097874 A2 | 10/2005 |
| WO | WO 2006/007413 A1 | 1/2006 |
| WO | WO 2006/013469 A1 | 2/2006 |
| WO | WO 2006/015313 A2 | 2/2006 |
| WO | WO 2006/043893 A1 | 4/2006 |
| WO | WO 2006/066776 A2 | 6/2006 |
| WO | WO 2007/015669 A2 | 2/2007 |
| WO | WO 2007/042258 A1 | 4/2007 |
| WO | WO 2007/059294 A2 | 5/2007 |
| WO | WO 2008/148771 A1 | 12/2008 |
| WO | WO 2009/065768 A1 | 5/2009 |
| WO | WO 2009/065769 A2 | 5/2009 |
| WO | WO 2009/065769 A3 | 5/2009 |
| WO | WO 2009/080772 A1 | 7/2009 |
| WO | WO 2009/080813 A1 | 7/2009 |
| WO | WO 2009/116926 A1 | 9/2009 |
| WO | WO 2009/124704 A1 | 10/2009 |
| WO | WO 2010/084466 A2 | 7/2010 |
| WO | WO 2010/094500 A1 | 8/2010 |
| WO | WO 2011/087422 A1 | 7/2011 |
| WO | WO 2011/087423 A1 | 7/2011 |
| WO | WO 2011/141851 A2 | 11/2011 |
| WO | WO 2012/004699 A2 | 1/2012 |
| WO | WO 2012/141647 A1 | 10/2012 |
| WO | WO 2013/056745 A1 | 4/2013 |

OTHER PUBLICATIONS

Pervan, Darko, et al., U.S. Appl. No. 13/912,587, entitled "Powder Overlay," filed Jun. 7, 2013.
Pervan, Darko, et al., U.S. Appl. No. 13/793,971, entitled "Wood Fibre Based Panels with a Thin Surface Layer," filed Mar. 11, 2013.
Wingårdh, Peter, et al., U.S. Appl. No. 61/670,924, entitled "Dispensing Device," filed Jul. 12, 2012.
Pervan, Darko, U.S. Appl. No. 61/681,279, entitled "Single Layer Scattering of Powder Surfaces," filed Aug. 9, 2012.
Parquet International, "Digital Printing is still an expensive process," Mar. 2008, cover page/pp. 78-79, www.parkettmagazin.com.
Floor Daily, "Shaw Laminates: Green by Design," Aug. 13, 2007, 1 pg, Dalton, GA.
Engstrand, Ola (Contact)/Valinge Innovation, Technical Disclosure entitled "Fibre Based Panels With a Wear Resistance Surface," Nov. 17, 2008, IP.com No. IPCOM000176590D, IP.com PriorArtDatabase, 76 pages.
Engstrand, Ola (Contact)/Valinge Innovation, Technical Disclosure entitled "WFF Embossing," May 15, 2009, IP.com No. IPCOM000183105D, IP.com PriorArtDatabase, 36 pages.
Engstrand, Ola (Contact)/Valinge Innovation, Technical Disclosure entitled "VA063 VA064 Scattering and Powder Backing," Nov. 11, 2011, IP.com No. IPCOM000212422D, IP.com PriorArtDatabase, 34 pages.
Pervan, Darko, et al., U.S. Appl. No. 61/751,393, entitled "Method of Producing a Building Panel and a Building Panel," filed Jan. 11, 2013.
International Search Report issued in PCT/EP2013/055293, Jul. 16, 2013, 4 pages, European Patent Office, Rijswijk, NL.
Pervan, Darko, et al., U.S. Appl. No. 14/089,928 entitled "Recycling of Laminate Floors," filed Nov. 26, 2013.
Pervan, Darko, et al., U.S. Appl. No. 14/151,973 entitled "A Method of Producing a Building Panel and a Building Panel", filed Jan. 10, 2014.
BTSLR Toledo, Inc. website. http://www.bltresins.com/more.html. "Advantages to Using Powdered Resins," May 26, 2007, 2 pages, per the Internet Archive WayBackMachine.
Nimz, H.H., "Wood," Ullmann's Encyclopedia of Industrial Chemistry, published online Jun. 15, 2000, pp. 453-505, vol. 39, Wiley-VCH Verlag GmbH & Co. KGaA, Weinheim, DE.
Pervan, Darko, U.S. Appl. No. 14/237,617, entitled "Panel Coating," filed Feb. 7, 2014.
Ziegler, Göran, et al., U.S. Appl. No. 14/184,299, entitled "Heat and Pressure Generated Design", filed Feb. 19, 2014.
Pervan, Darko, et al., U.S. Appl. No. 14/192,169, entitled "Fibre Based Panels with a Wear Resistance Surface", filed Feb. 27, 2014.
Ziegler, Göran, et al., U.S. Appl. No. 14/247,839, entitled A Powder Mix and a Method for Producing a Building Panel, filed Apr. 8, 2014.
Lindgren, Kent, et al., U.S. Appl. No. 14/321,288, entitled "A Method of Manufacturing Panel and a Building Panel," filed Jul. 1, 2014.

* cited by examiner

METHOD FOR PRODUCING A BUILDING PANEL

CROSS REFERENCE TO RELATED APPLICATIONS

The present application claims the benefit of U.S. Provisional Application No. 61/612,672, filed on Mar. 19, 2012. The entire contents of each of U.S. Provisional Application No. 61/612,672 are hereby incorporated herein by reference in their entirety.

FIELD OF THE INVENTION

Embodiments of the present invention relate to a method for producing a building panel such as a floor panel, a wall panel, a ceiling panel, a furniture component or the like.

TECHNICAL BACKGROUND

Wood fibre based direct pressed laminated flooring usually comprises a core of a 6-12 mm fibre board, a 0.2 mm thick upper decorative surface layer of laminate and a 0.1-0.2 mm thick lower balancing layer of laminate, plastic, paper or like material.

A laminate surface generally comprises two paper sheets, a 0.1 mm thick printed decorative paper and a transparent 0.05-0.1 mm thick overlay paper applied over the decorative paper and intended to protect the decorative paper from abrasion. The print on the decorative non-transparent paper is only some 0.01 mm thick. The transparent overlay, which is usually made of refined fibres (e.g. α-cellulose fibres), comprises wear resistant particles such as small hard and transparent aluminium oxide particles. The refined fibres are rather long, about 0.5-5 mm and this gives the overlay paper the required strength. In order to obtain the transparency, all natural resins that are present in the virgin wood fibres, have been removed and the aluminium oxide particles are applied as a very thin layer over the decorative paper. The surface layer of a laminate floor is characterized in that the decorative and wear properties generally are obtained with two separate layers one over the other.

The printed decorative paper and the overlay are impregnated with melamine formaldehyde resin and laminated to a wood fibre based core or particleboard core under heat and pressure.

The aluminium oxide particles may have a size in the range of 20-100 microns. The particles may be incorporated in the surface layer in several ways. For example they may be incorporated in the pulp during the manufacturing of the overlay paper. They may also be sprinkled on the wet lacquer during impregnation procedure of the overlay or incorporated in the lacquer used for impregnation of the overlay.

The wear layer may also be produced without a cellulose overlay. In such a case melamine formaldehyde resin and aluminium oxide particles are applied as a lacquered layer directly on the decorative paper with similar methods as described above. Such a wear layer is generally referred to as liquid overlay.

With this production method a very wear resistant surface can be obtained and this type of surface is mainly used in laminate floorings but it may also be used in furniture components and similar applications. High quality laminate floorings have a wear resistance of 4000-6000 revolutions, which corresponds to the abrasion classes AC4 and AC5 measured with a Taber Abraser according to ISO-standard.

It is also known that the wear resistance of a lacquered wood surface may be improved considerably by incorporating aluminium oxide particles in the transparent lacquer covering the wood surface.

The most common core material used in laminate floorings is fibreboard with high density and good stability usually named HDF—High Density Fibreboard. Sometimes also MDF—Medium Density Fibreboard—is used as core. Other core materials such as particleboard are also used.

Recently new "paper free" floor types have been developed where powder technology is used to obtain a solid laminate surface comprising a substantially homogenous mix of processed or non-processed wood particles, binders and wear resistant particles. Such floor types are below referred to as "solid laminate" floors. The wear resistant particles are preferably aluminium oxide particles and the binders are preferably thermosetting resins such as melamine formaldehyde resin. Other suitable materials are for example silica or silicon carbide. In general all these materials are preferably applied in dry form as a mixed powder on a HDF core and cured under heat and pressure to a 0.2-1.0 mm solid laminate layer. The solid layer in solid laminate floors provides high impact and wears resistance.

Powder technology is also used to produce floors with a surface that combines the paper technology and powder technology. Such floor types are below referred to as "wood powder laminate floors". A decorative paper is applied on a sub layer comprising wood powder and binders. The decorative paper is protected by a conventional overlay. The main advantages with such floors are that deep embossing and improved impact resistance may be obtained.

Powder technology can also be used to produce floors with a powder overlay arranged on a decorative layer. The powder overlay comprises wood particles, a binder and wear resistant particles such as aluminium oxide. The powder overlay replaces a conventional overlay and provides improved wear resistant properties compared to the conventional overlay.

The standard production of powder mixes for manufacturing of decorative surfaces for application areas such as flooring panels, worktops, wall panels, furniture and others, are based on a dry mixing process.

Wood particles, spray dried melamine formaldehyde resin, wear resistant particles and pigments are mixed and finely dispersed in a dry form in a mixer. As the powder mixes are produced in the dry form, the distribution of the binder is limited to be on the outside of the wood particles and the binder is not distributed over the surface of the wear resistant particles and pigments. Furthermore, distribution of additives in the mix is limited in the dry mixing process. Even if added, the desired effect of the additives may not be obtained due to the non-uniform distribution of the additives.

The deep impregnation of the wood particles as well as wetting of the pigments and the wear resistant particles used for improved wear resistance, are done in the pressing process at high temperature and high pressure. The steps during the pressing should include complete melting of the binder, distribution of the binder in the matrix comprising wood particles, pigment and wear resistant particles, and impregnation and wetting of solid surfaces. These steps should be fulfilled before reaching the gel point of the binder system and after that the final curing of the binder occurs.

A failure in these conditions will cause a surface with limited staining resistance and/or a hazy surface with high opacity.

Incomplete impregnation of the binder into open parts such as cavities and channels in the wood particles causes higher opacity as well as risk for bad staining resistance. In practice, it has been proven that it is difficult to make a powder overlay based on bleached particles, binder and wear resistant particles with low opacity.

Incomplete wetting of the wear resistant particle surfaces will cause bad adhesion between the resin matrix and the wear resistant particles, which gives micro pores in the interface. These micro pores create an open surface, in which capillarity attracts stain, which is hard to remove, thereby being hard to clean.

Although the above description relates to floorings, the above description of techniques and problems thereof is applicable also for other applications, such as laminates for other purposes, for example wall panels, ceiling panels, furniture etc.

The above description of various known aspects is the applicants' characterization of such, and is not an admission that any of the above description is considered as prior art.

SUMMARY

It is an object of embodiments of the present invention to provide an improvement over the above described techniques and known art.

A further object of at least certain embodiments of the present invention is to improve the staining resistance of a building panel.

Another object of at least certain embodiments of the present invention is to improve the transparency and/or translucency of the building panel.

A further object of at least certain embodiments of the present invention is to provide a method for producing a building panel improving the impregnation of the wood particles.

A further object of at least certain embodiments of the present invention is to provide a method for producing a building panel having improved distribution of an additive in a mix.

Another object of at least certain embodiments of the present invention is to prevent separation of the components of the mix during transport.

At least some of these and other objects and advantages that will be apparent from the description have been achieved by a method for producing a building panel, comprising forming a mix comprising wood particles, a solvent, a binder and optionally at least one additive, wherein the binder and optionally said at least one additive are homogenously distributed in the mix by means of the solvent and wherein the binder impregnates the wood particles, drying the mix, applying the mix on a substrate, and forming a layer by applying heat and pressure to the mix.

The building panel may be a floor panel, a wall panel, a ceiling panel, a furniture component or the like.

If using a thermosetting resin as a binder, the layer is formed by curing the mix by applying heat and pressure.

By solvent is meant a substance capable of forming a solution, a suspension or a colloid. The solvent may be a liquid such as water.

An advantage of at least certain embodiments of the present invention is that improved impregnation of the wood particles by the binder is obtained. Further, improved wetting of said at least one additive and other particles in the mix by the binder is also obtained. When mixing the wood particles with a binder in dry form, the binder is limited to be arranged on the outside of particles, and is consequently arranged between the wood particles in a resin matrix. However, by mixing the wood particles with the binder in liquid form by means of the solvent, the binder, being at least partly dissolved in the solvent and thus being in liquid form, impregnates the wood particles. When mixing the wood particles, the solvent and the binder, wherein the binder is at least partly dissolved in the solvent in a preceding step or added in dry form to the wood particles with solvent then being added, the binder at least partly impregnates and/or coats the surface of the wood particles. Further, the distribution of the binder in the mix is improved compared to mixing the wood particles with the binder in dry form. Furthermore, adhesion between the resin matrix and the wood particles is improved, thus resulting in reduced risk for formation of micro cracks or micro pores. As a consequence, a layer, which is easier to clean and less sensitive to contamination, is obtained.

A further advantage is that a layer having improved staining properties is obtained. By mixing the wood particles with the binder by means of the solvent, the binder penetrates into any cavity or channel in the wood particles. Any such cavity or channel is at least partly filled with the binder. Thereby, the staining resistance of the layer is improved since stains cannot penetrate into the wood particles and discolour the layer permanently. As a consequence, stains can be removed from the layer.

Furthermore, since the binder penetrates into any cavity or channel in the wood particles, transparency and/or translucency of the layer is improved. Normally, cavities or channels in the wood particles cause high opacity in the layer since they are filled with air. By filling, or at least partly filling, any cavity or channel in the wood particles by the binder, a more transparent layer is provided.

Another advantage is that embodiments of the inventive method allow addition of at least one additive in an easy and efficient way. Further, embodiments of the inventive method provide an improved distribution of additives in the mix. By adding an additive to the mix including the solvent, the solvent facilitates distribution of the additive in the mix. Thereby, the effect of the additive will be improved due to the uniform distribution in the mix. Additionally, due to the improved distribution of the additive, the amount of the additive required to obtain the desired result can be reduced.

Since the wood particles, the binder and said at least one additive are mixed in liquid form by means of the solvent, dust resulting from the mix is reduced, thus being more environmental friendly and easier to use in following production steps.

Additionally, after the mix is formed, the risk for separation of the components of the mix for example during transport is reduced, since the binder adheres and binds the wood particles to the additive without curing, thereby forming a granulate. The granulate is formed by the wood particle, binder and said at least one additive.

The substrate may be a core, a decorative layer or another powder layer.

The step of forming the mix may comprise mixing the wood particles, the binder and said at least one additive with the solvent. According to this alternative, the wood particles, the binder and the additive are preferably in dry form and form a dry powder mix. The solvent is added to the dry powder mix comprising the wood particles, the binder and the additive to form a wet powder or a paste, depending on the amount of solvent added to the powder mix.

The step of forming the mix may comprise mixing the wood particles with the solvent comprising the binder and said at least one additive. According to this alternative, the wood particles are mixed with the solvent comprising the binder and the additive. The binder and the additive are added to the solvent in a preceding step. The binder and, preferably the additive, are thus at least partly dissolved in the solvent, i.e. thus forming a binder in liquid form. Depending on the amount of solvent added to the powder mix, the mix forms a wet powder or a paste.

The mix may further comprise wear resistant particles, preferably aluminium oxide such as corundum. The wear resistant particles improve the wear resistance of the layer.

The mix may further comprise at least one pigment. The pigment may be a colour pigment or an effect pigment. By adding pigments to the mix including the solvent, or to the solvent directly, the distribution of the pigment in the mix will be improved. As a result, the amount of the pigment required for the desired effect may be reduced.

The substrate may be a core. Thereby, a building panel comprising a core and a surface layer formed by the mix comprising the wood particles, the binder, the solvent and the additive may be provided. In an alternative embodiment, a building panel comprising a core, a sub-layer formed by the mix comprising the wood particles, the binder and the additive and a decorative layer arranged on the sub-layer may be provided.

The core may be a wood-based core, preferably made of MDF, HDF, OSB, WPC, or particleboard.

The substrate may be a decorative layer. According to this embodiment, the mix forms an overlay arranged on the decorative layer. A building panel comprising a decorative layer and an overlay formed by the mix comprising the wood particles, the binder, the solvent and the additive may thus be provided. Preferably, the decorative layer is arranged on a core. The decorative layer may be a printed paper, a wood veneer, solid wood, a printed plastic layer, a wood powder based layer, a wood powder based layer including a print or the like.

The step of applying the mix on the substrate may comprise applying the mix on an additional layer formed of wood particles and a dry binder. Thereby, a building panel comprising a first layer and a second layer may be provided, wherein the first layer is formed by a dry mix of wood particles and a binder in dry form and the second layer is formed by a mix of wood particles, a solvent, at least one additive and a binder.

The layer may form a sub-layer. The sub-layer may be a functional layer having for example antistatic or sound absorbing properties. The desired properties of the sub-layer may be obtained by means of a certain additive in the mix.

The method may further comprise printing a print in the dried mix, preferably by means of digital printing. Due to the improved transparency of the layer formed by the inventive method, the visual impression of a print printed in the mix will be improved. As a result of the transparency of the layer, a more distinct and three-dimensional impression of the print may be obtained.

The step of forming and/or drying the mix may be performed under vacuum. As a consequence, the impregnation and wetting of the wood particles by the binder is further improved.

Said at least one additive may be a wetting agent, a release agent, a catalyst, an antistatic agent, a curing agent, a foaming agent, a coupling agent, a plasticizer or a compatibilizer.

The binder may be a thermosetting resin, preferably melamine formaldehyde.

The binder may be a thermoplastic resin.

The binder content may be 30-80% by weight of the mix. The wood particle content may be 1-50% by weight of the mix. The wood particles may be recycled, virgin or processed.

The solvent may be water, a glycol, a polyol or an alcohol.

The building panel may be a floor panel. The floor panel may be provided with a mechanical locking system.

According to a second aspect of the invention, embodiments of the present invention are realised by a building panel produced according to the inventive method. The building panel according to the second aspect of the present invention may incorporate some or all the advantages of the method, which previously has been discussed, whereby the previous discussion is applicable also for the building panel.

According to a third aspect of the invention, a method for producing a building panel is provided. The method comprises forming a mix comprising wood particles, a solvent, a binder and at least one additive, wherein the binder and said at least one additive are homogenously distributed in the mix by means of the solvent and wherein the binder impregnates the wood particles, drying the mix, applying the mix on a decorative layer, and forming a layer by applying heat and pressure to the mix.

If using a thermosetting binder, the layer is formed by curing the mix by applying heat and pressure.

The advantages described above with reference to the first aspect of the invention are applicable also for the third aspect of the invention. According to embodiments of this aspect of the invention, the mix forms an overlay over a decorative layer.

The decorative layer may be arranged on a core, preferably a wood-based core. The decorative layer may be a printed paper, a wood veneer, solid wood, a printed plastic layer, a wood powder based layer, a wood powder based layer including a print or the like.

BRIEF DESCRIPTION OF THE DRAWINGS

The present invention will by way of example be described in more detail with reference to the appended schematic drawings, which show embodiments of the present invention.

DETAILED DESCRIPTION

Figure 1:
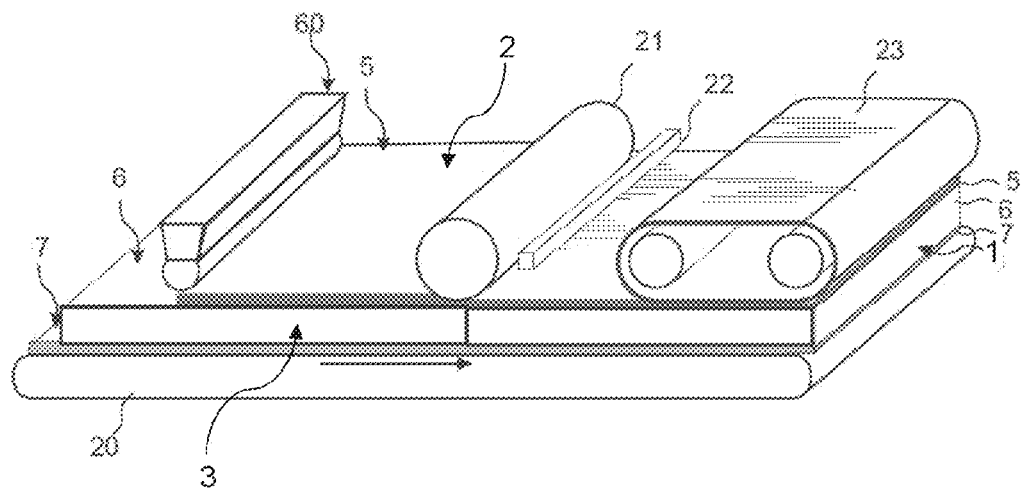
FIG. 1 shows a method for producing a building panel.

A method for producing a building panel 1 such as a floor panel, a wall panel, a ceiling panel, a furniture component or the like will now be described with reference to FIG. 1.

The method comprises forming a mix 2 comprising wood particles 14, a solvent, a binder 19 and at least one additive 15. The mix may be mixed in a mixer.

By wood particles 14 are meant wood particles on a macroscopic level. The wood particles 14 may be formed of wood fibres bundles or parts of wood fibre bundles. The wood particles 14 may be raw, recycled, virgin, processed or waste wood. By processed wood particles is meant wood particles that have been mechanically and/or chemically treated. By processed wood particles is further meant wood particles that have been bleached, sieved and/or milled. An example of such processed wood particles is Jelucel® HM 150 produced by Jelu-Werk. The wood particles 14 may have a length of less than 300 μm, preferably less than 100 μm.

As described above, the wood particles 14 may be refined or unrefined. Depending on the application, the lignin content of the wood particles 14 may vary. Both wood particles 14 having low lignin content, preferably less than 10%, and wood particles 14a having high lignin content, such that more than 20% may be used, depending on the application of the layer to be formed. In certain embodiments, α-cellulose particles are used. If the mix is to form an overlay, as in the embodiments described with reference to FIGS. 4 and 6, the wood particles 14 used are preferably refined and bleached, and are preferably virgin wood particles.

As an alternative or complement to wood particles, vegetable particles such as jute, linen, flax, cotton, hemp, bamboo, bagasse and sisal may be used. Mineral fibres such as glass fibre are also considered as an alternative or complement.

The wood particles 14 may be in form of a wood particle powder.

The binder 19 may be a thermoplastic or a thermosetting resin. Examples of thermosetting resins are melamine formaldehyde (MF), urea-formaldehyde (UF), phenol-formaldehyde (PF), or other examples of amino resins, epoxy, or a mixture thereof. Examples of thermoplastics are polyvinylchloride (PVC), polyethylene (PE), polyurethane (PU), polypropylene (PP), polystyrene (PS), polyamide (PA) etc.

The binder content may be 30-80% by weight of the mix. The wood particle content may be 1-50% by weight of the mix.

The solvent is preferably a liquid. The solvent may be water, a glycol, a polyol or an alcohol. Another example is acetone. The solvent is chosen such that the binder 19 is at least partly dissolvable in the solvent. However, the binder 19 does not have to be perfectly dissolved in the solvent, a suspension or colloid is also acceptable and included in the meaning of being dissolved.

Said at least one additive 15 may for example be a wetting agent, a release agent, a catalyst, an antistatic agent, a curing agent, a foaming agent, a coupling agent, a plasticizer or a compatibilizer. A person skilled in the art appreciates that more than one additive 15 of different types may be combined. By additive is meant any material added to the mix in order to improve a desired property of the panel to be produced or to improve or facilitate the forming of the panel. The additives 15 may both be an additive being consumed during or before curing and an additive 15 that still is present in the layer after curing.

In certain embodiments, other particles may be added to the mix. For example, in order to increase the wear resistance of the panel, wear resistance particles 12 such as aluminium oxide or silica may be added to the mix. Pigments may also be added to the mix. The pigments may be both colour pigments and effect pigments.

According to one alternative, the wood particles 14 of the above described type, the binder 19 of the above described type and said at least one additive 15 of the above described type are mixed together in dry form to form a dry powder mix 2. Thereafter, the solvent of the above described type is added to the dry powder mix comprising the wood particles 14, the binder 19 and said at least one additive 15. The binder 19 is thereby at least partly dissolved in the solvent. Consequently, after addition of the solvent, the binder 19 is in liquid form and a wet mix 2 is formed. Preferably, said at least one additive 15 is also at least partly dissolved in the solvent.

According to another alternative, the binder 19 is at least partly dissolved in the solvent before being added to the wood particles 14. Thereby, the binder 19 is added to the dry wood particles 14 in liquid form. The solvent having the binder 19 dissolved therein is added to the wood particles 14 such that a wet mix 2 is formed. The binder 19, the wood particles 14 and the solvent are of the above described type.

Said at least one additive 15 of the above described type may be added to the solvent before being mixed with the wood particles 14 or may be mixed with the wood particles 14 in dry form before the solvent is added.

A combination of the above described alternatives is also possible. In this case, a part of the wood particles 14 are mix with the binder 19 in dry form, and the solvent is added to the dry mix 2 comprising the wood particles 14, the binder 19 and said at least one additive 15. A second part of the wood particles 14 are mixed with the binder 19 being at least partly dissolved in the solvent, i.e. a liquid binder.

Irrespectively of which alternative being used, the result is a mix 2 comprising wood particles 14, binder 19, solvent and at least one additive 15. The resulting mix 2 is a wet mix. Depending on the amount of solvent, the mix 2 may be in form of a wet powder or a paste.

The binder 19 impregnates and/or at least partly coats the surface of the wood particles 14. The binder wets the wear resistant particles 12, said at least one additive 15 and any other particle added to the mix. The binder 19 also penetrates in any air cavity or channel formed in the wood particles 14. By using a binder 19 being at least partly dissolved in the solvent, the distribution of the binder 19 in the mix 2 is improved compared to a dry mix.

Furthermore, since the binder 19 and said at least one additive 15 are at least partly dissolved in the solvent, the liquid solvent facilitates distribution of the binder 19 and said at least one additive in the mix 2. The liquid solvent homogenously distributes the binder 19 and said at least one additive 15 in the mix 2. A more homogenous distribution of the binder 19 and said at least one additive 15 is obtained compared to a dry mix.

In a subsequent step, the mix 2 is dried, for example by heating the mix 2, by IR heating, by conditioning etc. The mix 2 is dried such that the mix 2 obtains certain moisture content, for example 0.5-10%. The desired moisture content is dependent on the solvent. As an example, the mix 2 may be dried at 60° C. for 24 hours. The mix 2 is dried such that a substantially dry powder mix is formed.

Depending on the solvent used, the solvent may at least partly evaporate during drying, for example if water is used as a solvent. If another type of solvent is used, the solvent may still be present in the mix after drying. If required, the mix 2 may also be milled and/or sieved. The wood particles 14 may be milled to a size of less than 300 μm, preferably less than 100 μm.

In order to further improve the impregnation of the wood particles 14 and wetting of said at least one additive 15 and any other particles such as wear resistant particles 12, the mixing may be performed under vacuum. The drying may also be performed under vacuum in order to improve impregnation of the wood particles 14. By using vacuum and heat during the mixing, the mix 2 may be dried in the mixer.

Figure 2:
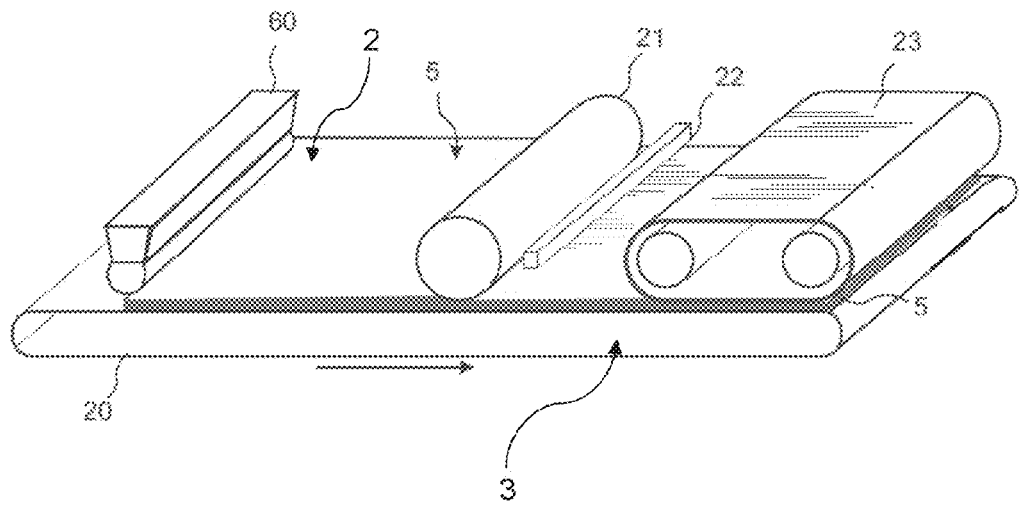
FIG. 2 shows a method for producing a building panel.

The mix 2 comprising the wood particles 14, the binder 19, the solvent and said at least one additive 15 is applied on a substrate 3, which is shown in FIGS. 1 and 2. The mix 2 is applied to the substrate 3 as a powder. The mix 2 can be scattered over the substrate by a scattering device 60. The mix 2 is then formed into a layer by applying heat and pressure. If using a thermosetting resin, the mix 2 is cured by applying heat and pressure. The mix 2 may be pressed at 150-210° C. and 30-100 bar during 10-55 seconds. As a specific example, the mix 2 may be pressed at 170° C. and 40 bar during 35 seconds. The pressure may be applied in a continuous pressing equipment by a roller 21, press belt 23 or press matrix. Alternatively, a discontinuous pressing equipment may also be used.

When the mix 2 has cured, a layer 5 is formed.

An embossed surface can be obtained by pressing the mix 2 against an embossed pressure matrix.

The mix 2 may be pressed in one step or an intermediate pressing step may be introduced before a final pressing step. In the intermediate pressing step, the mix 2 is partly compressed with a roller 21. Continuous or discontinuous pressing equipment may be used. The mix 2 is preferably not cured, or at least not completely cured, during the intermediate pressing step.

Figure 3A:
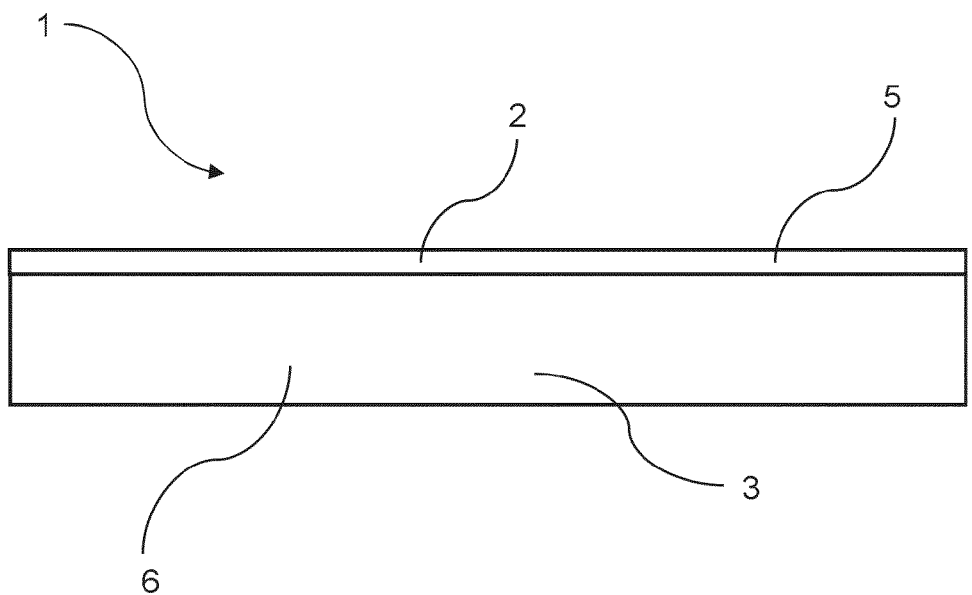
FIG. 3a shows a first embodiment of a building panel.
Figure 3B:
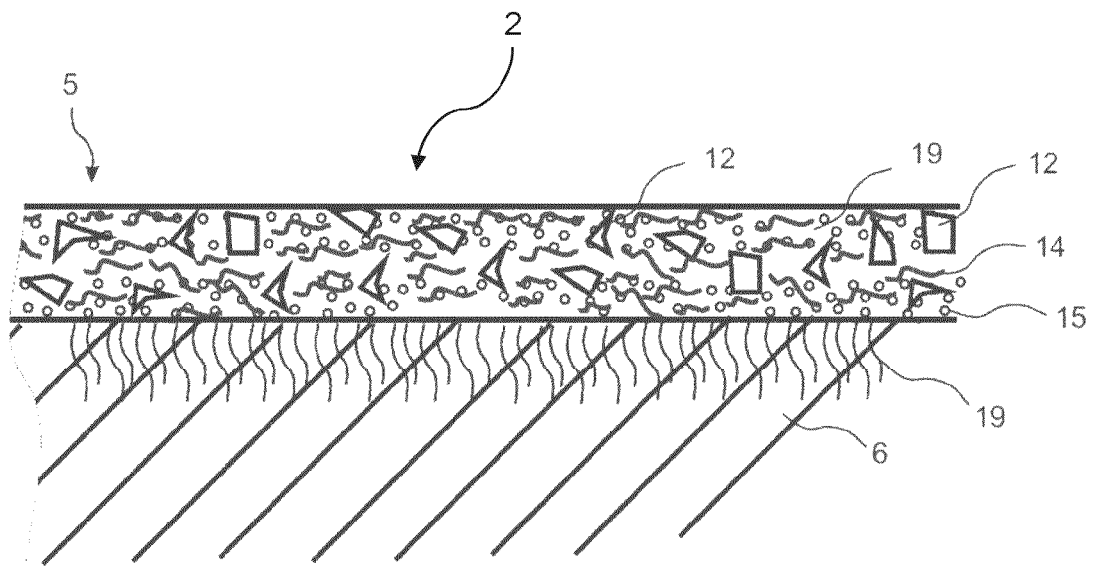
FIG. 3b shows the embodiment shown in FIG. 3a in more detail.

In a first embodiment, which is shown in FIGS. 3a and 3b, the mix 2 is applied to a core 6. The core 6 may be a wood-based core such as MDF, HDF, OSB, WPC (Wood Polymer Composite) or particleboard. In other embodiments, the core 6 may be a mineral board, a plastic board or similar. The core 6 may comprise a thermoplastic resin or a thermosetting resin.

When applying heat and pressure to the mix 2 arranged on the core, the mix simultaneously adheres to the core.

In the embodiment shown in FIGS. 3a and 3b, the mix 2 forms a surface layer 5 arranged an upper surface of the core 6. Additives 15 of a type not being consumed during curing are uniformly distributed through the surface layer 5. If other particles are added to the mix 2, such as wear resistant particles 12 and/or pigments, these particles will also be uniformly distributed through surface layer 5. The upper surface of the core 6 may be in contact with the additives 15. If wear resistant particles 12 and/or pigments are included, also these particles will may in contact with the upper surface of the core 6. A part of the binder 19 of the mix 2 may also penetrate into the core 6.

The surface layer 5 may be a decorative surface layer. As described above, pigments may be added to the mix 2 in order to obtain a pigmented/coloured layer or a layer having certain properties by adding an effect pigment. As an alternative or complement, the mix 2 may be applied to a core 6 having a coloured upper surface. By colouring the upper surface of the core 6 in a suitable colour, the amount of pigment required in the mix 2 may be reduced. An upper surface of the core 6 may be painted.

The binder content in the mix forming the decorative surface layer may be 30-60% by weight of the mix. The wood particle content in the mix forming the decorative surface layer may be 20-50% by weight of the mix.

The mix 2 may also be applied to a core 6 having a print printed directly an upper surface of the core 6. The print may for instance be formed by means of digital printing or by direct printing.

Furthermore, a print may be printed in the mix 2. The print may be printed by a digital printing technique, preferably by an inkjet printer 22. The mix thereby forms a print layer. The print is printed in the mix 2 before applying heat and pressure to the mix 2. If a pre-pressing step is used, printing may take place after the pre-pressing step but before final pressing. The binder content in the mix forming the print layer may be 50-80% by weight of the mix. The wood particle content in the mix forming the print layer may be 10-35% by weight of the mix.

In an alternative embodiment, the substrate 3 on which the mix applied is a temporary substrate such as a press belt 20, a press plate, or a release foil, which is shown in FIG. 2. A layer 5, which can be separated from the substrate 3, is thus formed. The layer 5 can in a separate step be attached to a core 6 or another layer.

Figure 4:
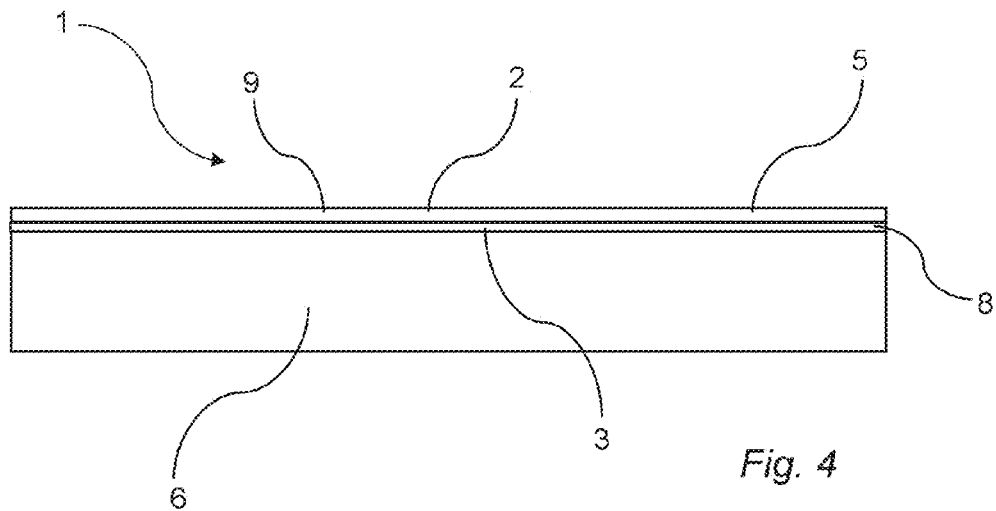
FIG. 4 shows a second embodiment of a building panel.

In a further embodiment, the mix 2 forms an overlay 9. In such an embodiment, which is shown in FIG. 4, the mix 2 is applied to a decorative layer 8. The decorative layer 8 may be a decorative paper layer, a decorative plastic layer such as PVC or PU, a powder-based print layer, a printed core as described above, a wood surface layer, a wood veneer surface layer or any other decorative layer. Preferably, the decorative paper or plastic layer is printed paper or plastic layer, which is printed for instance by means of digital printing, direct printing or rotogravure printing.

The decorative layer 8 may be arranged on a core 6 of the type described above with reference to FIGS. 3a and 3b, or may form a separate decorative layer 8 to be attached to a core 6 later on.

In this embodiment, the mix 2 is applied to the decorative layer 8. The mix 2 is formed into an overlay layer 9 by application of heat and pressure. If a thermosetting binder is used, the mix 2 is cured to form the overlay layer 9. When applying heat and pressure to the mix 2, the mix 2 is simultaneously adhered to the decorative layer 8. Embodiments of the inventive method is especially suitable for forming such an overlay 9 due to its increased transparency and stain resistance. By adding wear resistant particles 12 such as aluminium oxide to the mix, the overlay 9 provides the desired wear resistance properties.

The binder content in the mix forming the overlay layer may be 50-80% by weight of the mix. The wood particle content in the mix forming the overlay layer may be 10-35% by weight of the mix.

Figure 5:
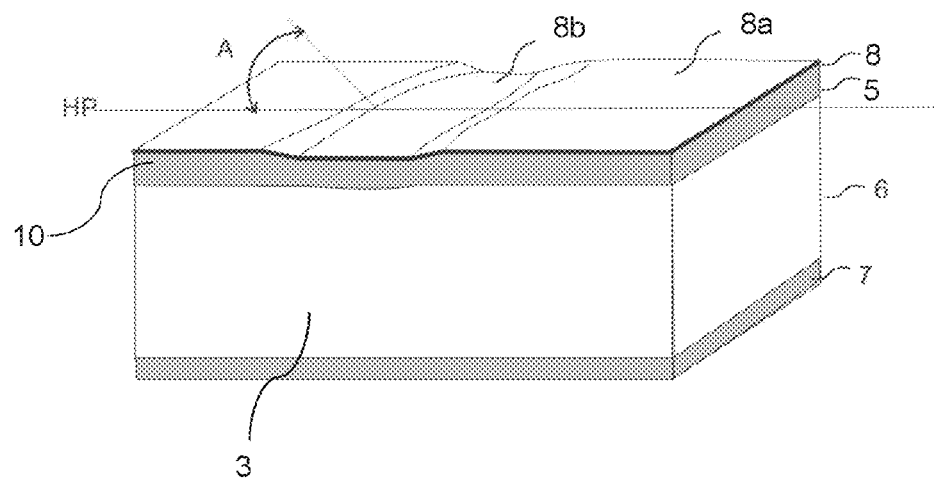
FIG. 5 shows a third embodiment of a building panel.

The inventive method may also be used to form a sub-layer 10. In this embodiment, which is shown in FIG. 5, the mix 2 is applied to a substrate 3, for example in form of a core 6 of the type described above with reference to FIGS. 3a and 3b. The mix 2 is then formed into a layer by applying heat and pressure as previously described. If a thermosetting binder is used, the mix 2 is cured by applying heat and pressure. An additional layer such as a decorative layer 8 of the type described above with reference to FIG. 4, is arranged on the sub-layer 10 such that the sub-layer 10 is arranged between the core 6 and the additional layer 8.

Alternatively, the additional layer such as a decorative layer 8 may be arranged on the mix 2, which is to form the sub-layer, 10 before applying heat and pressure to form the sub-layer 10. When applying heat and pressure, the additional layer 8 is simultaneously adhered to the sub-layer 10 as the mix 2 is formed and/or cured into the sub-layer 10. The binder content of the mix forming the sub-layer 10 may be 30-60% by weight of the mix. The wood particle content in the mix forming the sub-layer 10 may be 20-50% by weight of the mix.

Figure 6:
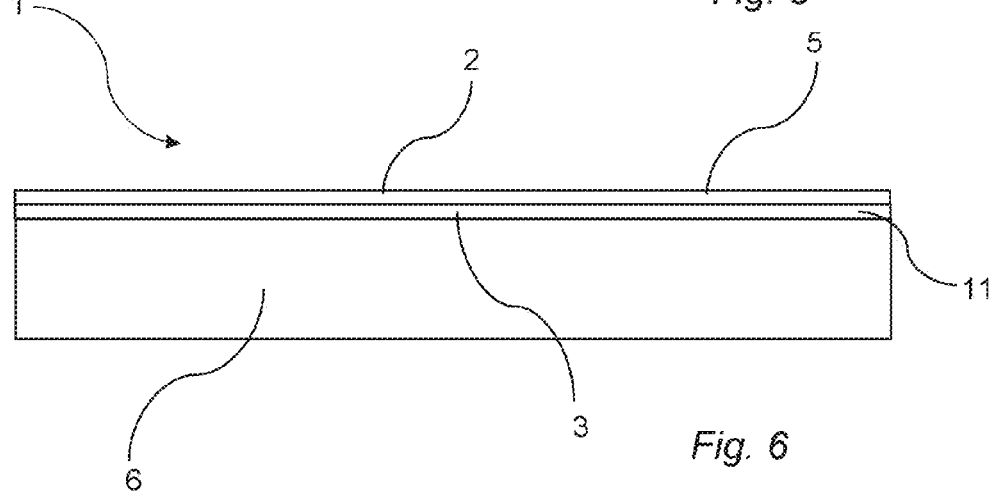
FIG. 6 shows a fourth embodiment of a building panel.

It is also contemplated that more than one layer comprising wood particles 14, at least one additive 15 and a binder 19 may be arranged on a substrate 3. In one embodiment, which is shown in FIG. 6, a first layer 11 formed of a mix formed of wood particles 14 and a binder 19 in dry form is arranged on a substrate 3 such as a core 6 of the type described above. A second layer 5 formed in accordance with embodiments of the inventive method is arranged on the first layer 11. The second layer 5 is thus formed from a mix 2 comprising wood particles 14, a binder 19, a solvent and at least one additive 15. The first and second layers 11, 5 are formed by applying heat and pressure in a common step, for example by curing the binder. Alternatively, the first layer 11 is formed in a preceding step before applying the second layer 5, which is formed in a following step.

It is also contemplated that both a sub-layer arranged on a substrate and a top-layer arranged on a sub-layer may be produced by the inventive method. The binder content of the mix forming the sub-layer 10 may be 30-60% by weight of the mix. The wood particle content in the mix forming the sub-layer 10 may be 20-50% by weight of the mix. The binder content of the mix forming the top-layer may be 50-80% by weight of the mix. The wood particle content of the mix forming the top-layer may be 1-30% by weight of the mix.

It is also contemplated that the above described top-layer may be arranged on any type of decorative layer.

The mix 2 may form a functional layer, such as an antistatic layer, a sound absorbing and/or sound insulating layer, a moisture barrier layer. Such a functional layer may be arranged as a sub-layer.

Since the mix 2 does not have a restricted movement in either horizontal or vertical directions, the mix 2 is advantageous for forming embossed portion. Embossed portions may be formed in a layer formed from the mix 2 forming the surface layer 5 as described above with reference to FIGS. 3a and 3b, or when forming an overlay 9 as described with reference to FIG. 4. When the mix forms a sub-layer 10, deep embossing may be performed which extends into the sub-layer, which is shown in FIG. 5. In FIG. 5, the decorative layer 8 is provided with upper portions 8a and embossed portions 8b lower than the upper portions 8a essentially by shaping the sub-layer 10.

The building panel 1 formed by embodiments of the inventive method is especially suited for be used as a floor panel. The floor panel may be provided with a mechanical locking system 4 of the type described in for example WO2006/043893, WO2007/015669, WO2009/116926.

Figure 7A:
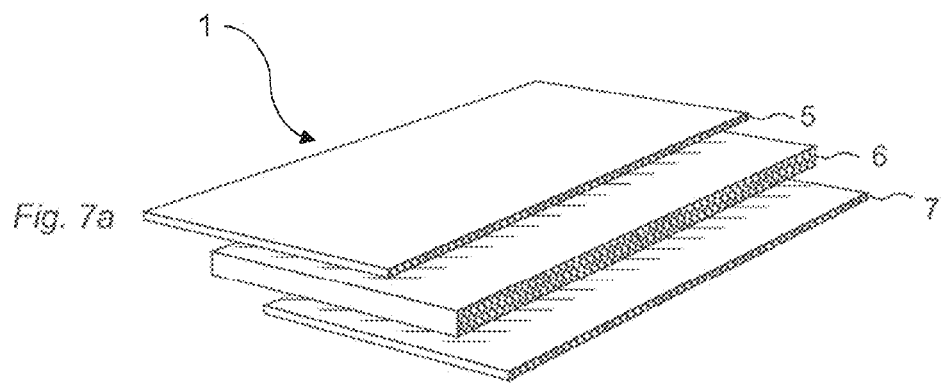
FIG. 7a-d show floor panels and a method to produce an edge portion provided with a mechanical locking system.
Figure 7B:
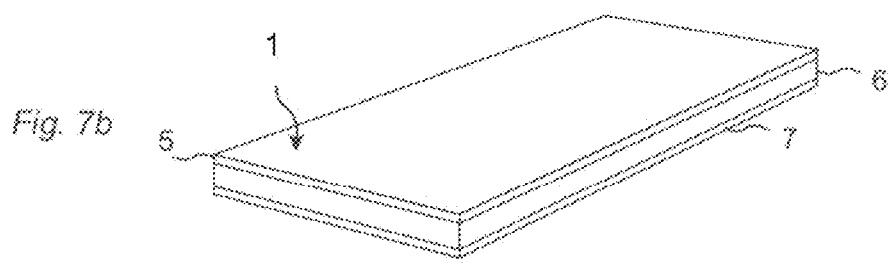
Figure 7C:
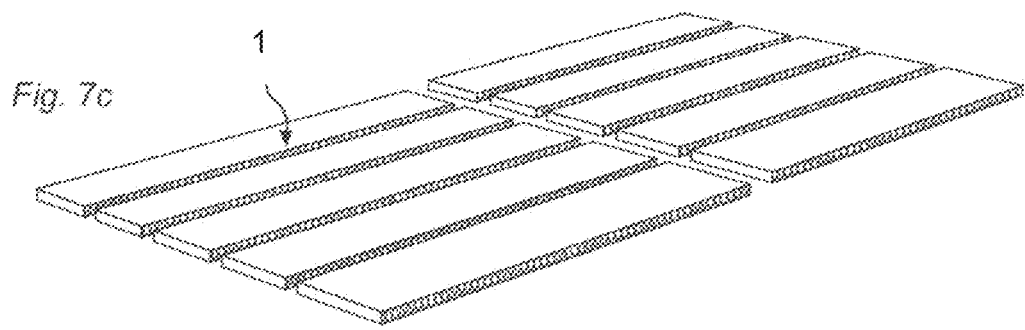
Figure 7D:
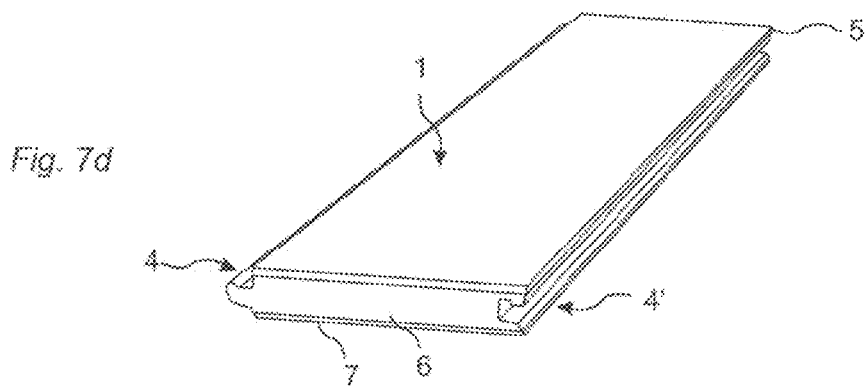

FIG. 7a shows a building panel 1 which is to form a floor panel according to an embodiment of the disclosure. The building panel 1 comprises a surface layer 5 which is produced according to an embodiment of the disclosure and arranged on a core 6. A balancing layer 7 is applied at the rear side as shown in FIG. 7b. FIG. 7c shows the building panel after it has been cut into several floor elements 2. FIG. 7d show floor elements, which have been formed to a floor panel 1 with mechanical locking systems 4, 4' at the long edges. A mechanical locking system is generally also formed on the short edges. All known locking systems allowing locking with angling, horizontal and vertical snapping, fold down, side push etc. may be used. The floor panels may however also have rather simple locking systems or only straight edges similar to tiles and stone and they may be glue down to the sub floor.

Figure 8:
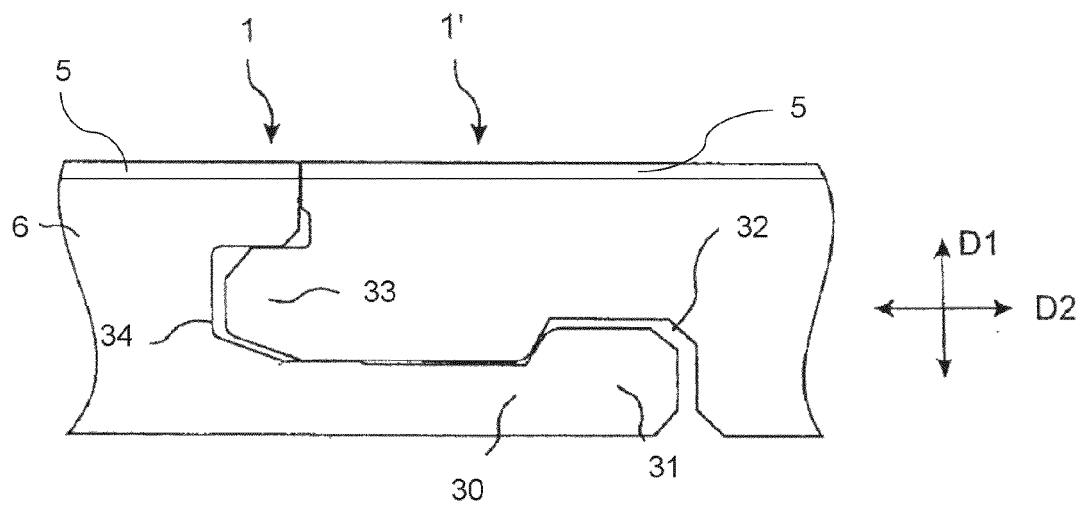
FIG. 8 shows floor panels provided with a mechanical locking system.

FIG. 8 shows such floor panels 1, 1' with a mechanical locking system 4. The mechanical locking system 4 comprises a locking strip 30 with a locking element 31 that cooperates with a locking groove 32 and locks the panels 1, 1' in a horizontal direction D2. The mechanical locking system 4 further comprises a tongue 33 that cooperates with a tongue groove 34 and locks the panels 1, 1' in a vertical direction D1. Both long sides and short sides of the floor panel may be provided with a mechanical locking system. Alternatively, long sides of the floor panel may be provided with the mechanical locking system for horizontally and vertically locking, and the short sides may be provided with a mechanical locking system for horizontally locking only. It is also contemplated that other locking systems is possible.

A balancing layer 7 may be attached to the rear side of the core 6 or substrate 3 in the above described embodiments. Also the balancing layer 7 may be formed by embodiments of the inventive method. The binder content of the mix forming the balancing layer 7 may be 50-80% by weight of the mix. The wood particle content of the mix forming the balancing layer 7 may be 15-45% by weight of the mix.

Embodiments of the present invention are particularly suitable for use in floating floors. However, embodiments of the invention do not exclude floors that are glued down to a sub floor.

It should be emphasized that embodiments of the invention may be used as a panel or as a surface layer, which is for example glued to a core. The disclosure may also be used in applications as for example wall panels, ceilings, and furniture components and similar. It may also be used in floorings with optional surface materials such as cork or wood, in order to improve wear and design properties.

Embodiments of the invention will now be described with reference to the following non-limiting examples.

Example 1

Powder-Based Overlay Formed by a Dry Mixing Process

Spray dried melamine formaldehyde resin (MF) (64 wt %), bleached wood particle (27 wt %), additives in form of a release agent PAT523W (0.5 wt %), a wetting agent PAT959/F (0.5 wt %), a catalyst PATHS710 (0.5 wt %), and aluminium oxide (9 wt %), were mixed in the dry state for 15 minutes and then used as powder-based overlay on a black powder based decor.

The build-up was pressed at 170° C. and 40 bar during 35 seconds.

The outcome was a hazy greyish surface, with weaknesses in staining resistance.

Example 2

Powder-Based Overlay Formed by a Combined Wet and Dry Mixing Process 424 g of dry wood particle was mixed with 100 g of aluminium oxide and %), and additives in form of a release agent PAT523W (0.5 wt %), a wetting agent PAT959/F (0.5 wt %), a catalyst PATHS710 (0.5 wt %), to form a dry mix. 1200 g of wet melamine formaldehyde resin (50 wt % MF) was added to the dry mix and mixed for 10 min. The final mix, still behaved as a powder, containing the extra added water.

The powder was dried at 60° C. for 24 h and then milled to a size less than 300 μm.

The resulting dry composition of the powder produced was 55 wt % melamine formaldehyde resin (MF), 36 wt % bleached wood particle and 9 wt % aluminium oxide.

The powder was used as a powder overlay on a black and white powder based decors, the build ups were pressed at 170° C. and 40 bar during 35 seconds.

The black décor showed good transparency and the white décor perfect staining resistance. The white décor showed a surface staining of 5(5) according to EN438 based on test using a permanent marker.

Example 3

Powder-Based Overlay Formed by a Combined Wet and Dry Mixing Process 318 g of dry wood particle was mixed with 100 g of aluminium oxide and additives in form of a release agent PAT523W (0.5 wt %), a wetting agent PAT959/F (0.5 wt %), a catalyst PATHS710 (0.5 wt %), to form a dry mix. 1400 g of wet melamine formaldehyde resin (50 wt % MF) was added to the dry mix and mixed for 10 min. The final mix was in the form of a paste.

The paste was dried during three days in ambient climate and thereafter dried at 60° C. for 24 hours. The mix is then milled to a size less than 300 μm.

The resulting dry composition of the powder produced was 64 wt % melamine formaldehyde resin (MF), 27 wt % bleached wood particle and 9 wt % aluminium oxide.

The powder was used as a powder overlay on a black and white powder based decors, the build ups were pressed at 170° C. and 40 bar during 35 seconds.

The black décor showed excellent transparency and the white décor perfect staining resistance. The white décor showed a surface staining of 5(5) according to EN438 based on test using a permanent marker.

Example 4

Addition of Water to a Complete Powder Mix

The method described in the examples above show how to improve transparency and staining resistance of the product with the help of a second layer. The first layer gives the design and the second layer the staining resistance.

In WO 2009/065769 a method is described to build up a surface comprising a powder layer, which has both a decorative and a wear and stain resistant function. This powder has the same weaknesses as described in example 1 for the dry powder overlay mix.

The staining resistance of a 1-layer powder can be improved considerably by adding water and/or additives to a powder mixture described in WO 2009/065769 (1 part of water to 1 part of powder). The water is mixed thoroughly with the powder to a homogenous paste. The paste is dried after that for 72 h in ambient climate and 24 h at 60° C. and milled and sieved, if necessary. The staining resistance of this product is good.

Instead of using dried binder and adding water a liquid binder can be used (mixing, optionally vacuum-impregnation), further processed as described above. The staining resistance of such a product is outstanding, showing a surface staining of 5(5) according to EN438 based on test using a permanent marker. Colours of those powders are more intensive as of respective dry mixed powders. Therefore the amount of pigments can be reduced.

Example 5

Print Layer

Printed patterns on a powder based overlay as described in example 3 have more clearly and intensive colours as on a powder produced as described in example 1.

It is contemplated that there are numerous modifications of the embodiments described herein, which are still within the scope of the invention as defined by the appended claims. For example, it is contemplated that the mix may be used to form more than one layer, for example both a sub-layer and an overlay, or several layers arranged on top of each other. The layers may be formed by applying heat and pressure in one step, or in individual steps for each layer. It is also contemplated that further additives and/or particles in addition to the above described particles and additives can be added to the mix. It is also contemplated that a binder comprising both a thermoplastic binder and a thermosetting binder may be used in the mix.

The invention claimed is:

1. Method for producing a building panel, comprising forming a mix comprising wood particles, a solvent, a binder and optionally at least one additive, wherein the binder, and optionally said at least one additive, are homogenously distributed in the mix by means of the solvent and wherein the binder impregnates the wood particles,
drying the mix to form a dried mix,
applying the dried mix on a core, and
forming a layer by applying heat and pressure to the dried mix.

2. Method according to claim 1, wherein the step of forming the mix comprises adding the solvent to a mix of the wood particles, the binder and optionally said at least one additive.

3. Method according to claim 1, wherein the step of forming the mix comprises mixing the wood particles with the solvent comprising the binder and optionally said at least one additive.

4. Method according to claim 1, wherein the mix further comprises wear resistant particles.

5. Method according to claim 4, wherein the wear resistant particles are aluminium oxide.

6. Method according to claim 1, wherein the mix further comprises at least one pigment.

7. Method according to claim 1, wherein the core is a wood-based core.

8. Method according to claim 7, wherein the wood-based core is MDF, HDF, OSB, WPC or particle board.

9. Method according to claim 1, wherein the step of applying the dried mix on the core comprises applying the dried mix on an additional layer formed of wood particles and a dry binder, the additional layer being on the core.

10. Method according to claim 1, wherein the method further comprises forming an additional layer over said layer, such that said layer forms a sub-layer.

11. Method according to claim 10, wherein the additional layer is formed on the dried mix prior to the step of forming the layer.

12. Method according to claim 1, further comprising printing a print in the dried mix.

13. Method according to claim 12, wherein the printing is a digital printing.

14. Method according to claim 1, wherein the step of forming and/or drying the mix is performed under vacuum.

15. Method according to claim 1, wherein the mix comprises the at least one additive.

16. Method according to claim 15, wherein said at least one additive is a wetting agent, a release agent, a catalyst, an antistatic agent, a curing agent, a foaming agent, a coupling agent, a plasticizer or a compatibilizer.

17. Method according to claim 1, wherein the binder is thermosetting resin.

18. Method according to claim 17, wherein the binder is an amino resin.

19. Method according to claim 17, wherein the binder is melamine formaldehyde resin.

20. Method according to claim 1, wherein the binder is a thermoplastic resin.

21. Method according to claim 1, wherein the wood particles are recycled, virgin or processed.

22. Method according to claim 1, wherein the solvent is water, a glycol, a polyol or an alcohol.

23. The method of claim 1, wherein the dried mix is applied directly on the core.

24. Method for producing a building panel, comprising
forming a mix comprising wood particles, a solvent, a binder and optionally at least one additive, wherein the binder, and optionally said at least one additive, are homogenously distributed in the mix by means of the solvent and wherein the binder impregnates the wood particles,
drying the mix to form a dried mix,
applying the dried mix on a decorative layer, and
forming a layer by applying heat and pressure to the dried mix.

25. Method for producing a building panel, comprising
applying a dried mix on a core, and
forming a layer by applying heat and pressure to the dried mix, wherein the dried mix is formed by drying a mix comprising wood particles, a solvent, a binder and optionally at least one additive, wherein the binder, and optionally said at least one additive, are homogenously distributed in the mix by means of the solvent and wherein the binder impregnates the wood particles.

\* \* \* \* \*